Oct. 6, 1964 H. M. HERBENER 3,151,651

BILLFOLDERS AND METHOD OF PRODUCING THE SAME

Filed Dec. 4, 1962 6 Sheets-Sheet 4

INVENTOR.
HENRY M. HERBENER
BY
Byerly, Townsend, Levaton & Churchill
HIS ATTORNEYS.

Oct. 6, 1964

H. M. HERBENER 3,151,651

BILLFOLDERS AND METHOD OF PRODUCING THE SAME

Filed Dec. 4, 1962

INVENTOR.
HENRY M. HERBENER
BY
Byerly, Townsend, Watson & Churchill
HIS ATTORNEYS.

United States Patent Office 3,151,651
Patented Oct. 6, 1964

3,151,651
BILLFOLDERS AND METHOD OF PRODUCING
THE SAME
Henry M. Herbener, 406 Remington Ave.,
Thomasville, Ga.
Filed Dec. 4, 1962, Ser. No. 242,171
16 Claims. (Cl. 150—35)

This invention relates to billfolders.

My prior patents, Nos. 2,277,104; 2,288,704; 2,346,433; 2,346,434; 2,358,008 and 2,589,546, disclose billfolders and the like of types broadly similar to the invention disclosed herein. The billfolders of these prior patents are constructed of genuine leather including sections which are secured together during manufacturing by stitching with thread. The billfolders produced in accordance with these prior patents are of excellent quality but are necessarily expensive due to the materials employed and the manufacturing processes employed.

My prior patents, Nos. 2,863,484; 2,863,485 and 2,863,486, disclose somewhat similar billfolders formed entirely of heat sealable sheet plastic material which is very inexpensive, as compared to genuine leather, and the manufacturing process for these all-plastic billfolders, in mass production, is very low, as compared to the stitching process for the genuine leather billfolders, enabling the plastic billfolders to be marketed at a very low price.

However, the all-plastic billfolders, while closely resembling leather in appearance and "feel," have the disadvantage that they do not wear well after continued rough usage and tend to crack and tear at their regions of flexure, and once cracks are developed, the plastic billfolders tend to disintegrate quite rapidly. Therefore, they are not the complete answer to a satisfactory low price billfolder having the appearance, feel and wearability of the more expensive leather billfolders.

Accordingly, the principal object of this invention is the provision of a low price billfolder of a type broadly similar to the billfolders in my above-mentioned prior patents, and formed of materials which render the same substantially as durable and long-lasting and attractive as the genuine leather billfolders, and substantially as economical to manufacture in quantity as the all-plastic billfolders.

Another object of the invention is the provision of a billfolder which, in addition to the above-mentioned characteristics, incorporates a number of important constructional improvements over the billfolders covered by my mentioned prior patents, rendering the present billfolders still more attractive in design and more convenient to use; which constructional advantages may be availed of, if desired, in a leather billfolder since the blanks that I use in the construction of my billfolder are of such shape that they can be fastened by stitching when necessary.

In connection with the present invention, I have discovered that by using a plastic-coated woven fabric, instead of all-plastic sheet material, for the body portion of the billfolder, in conjunction with certain portions of all-plastic heat sealable material, a very superior and highly economical billfolder may be produced with the appearance, "feel" and other physical characteristics closely simulating genuine leather and which are highly resistant to tearing and wear in general. The cloth or fabric is coated on one side only with a thin coating of heat sealable plastic material, and where it becomes necessary to join a pair of non-coated fabric sides or one such side with a coated side, a section of heat sealable all-plastic material is employed between such sides in a novel manner to facilitate permanently joining the sides and to simultaneously serve other important purposes in the completed billfolder, including the formation of transparent windows, pockets, closure flaps and sealed edges on the billfolder body portion to entirely eliminate raw or cut edges on the finished product.

In this last connection, it is an important feature of my invention that a billfolder is provided which is entirely free of unsealed cut edges and which has rolled or folded edges at all important points subject to the most wear and visible to the eye in the finished product.

Another feature of my invention is the provision of a billfolder having a coin cup of improved construction and operation, produced by a novel and improved manner of heat sealing the layers of material constituting the coin cup.

Still another important feature of the present invention is the fact that it overcomes a tendency for the body portions of ordinary billfolders to buckle or wrinkle when folded on the main transverse folding line. This tendency is occasioned by the fact that two thicknesses of material are employed in the billfolder body portion to give the same body and to provide continuous folded edges on the body portion. A simple constructional detail has been incorporated in the billfolder of the present invention to completely eliminate the buckling or wrinkling tendency of the body portion when folded.

Other important features and advantages of the invention will be apparent during the course of the following detailed description of the specific embodiment of my invention which I now prefer, and of the assembly thereof, which is illustrated in the accompanying drawings, in which:

Figures 1, 2:
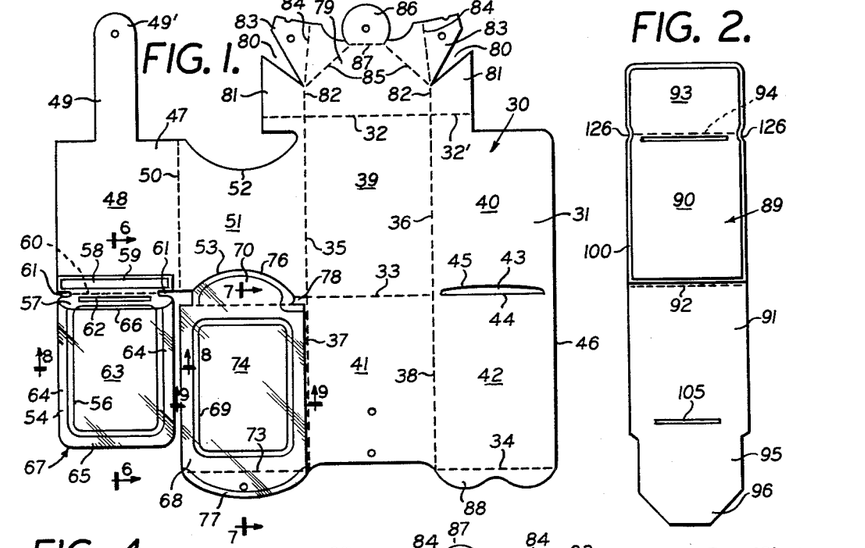
FIG. 1 is a plan view of a main blank employed in the formation of the billfolder according to one preferred embodiment thereof.
FIG. 2 is a plan view of a separate supplemental blank employed with the main blank for constructing the billfolder.
Figure 3:
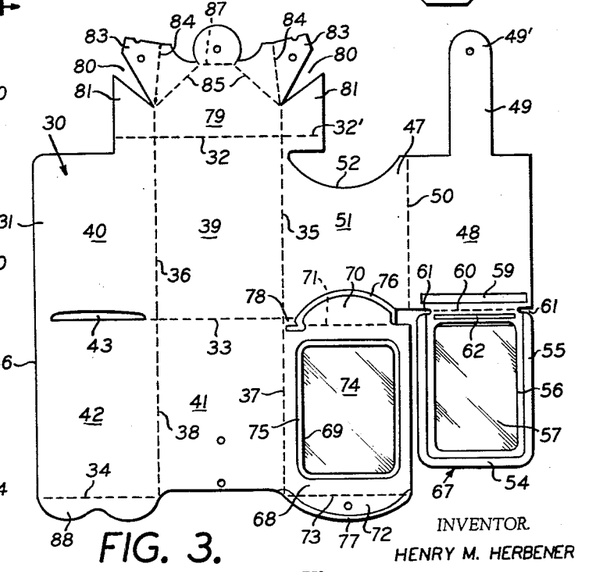
FIG. 3 is a plan view showing the reverse side of the main blank.

The basic elements from which my new billfolder is constructed are shown in FIGS. 1-4, inclusive, of the drawings. In these figures, the numeral 30 designates an initially flat main blank formed of woven fabric and coated upon one side only with a thin film of heat sealable plastic material such as a vinyl resin or another thermoplastic. FIG. 1 shows the uncoated side of the blank 30 arranged uppermost, whereas FIG. 3 shows the coated side of the main blank arranged uppermost. The main blank 30 is quite thin and flexible and highly resistant to tearing, and it is readily foldable repeatedly without cracking. The coated fabric employed for the blank 30 is somewhat similar to present-day automobile upholstery fabrics, although the plastic material coating the main blank is considerably thinner than the coating utilized on ordinary upholstery fabric, so that the blank is more flexible and resistant to cracking, without appreciable diminution of its tear strength.

Figures 23, 24, 25, 26:
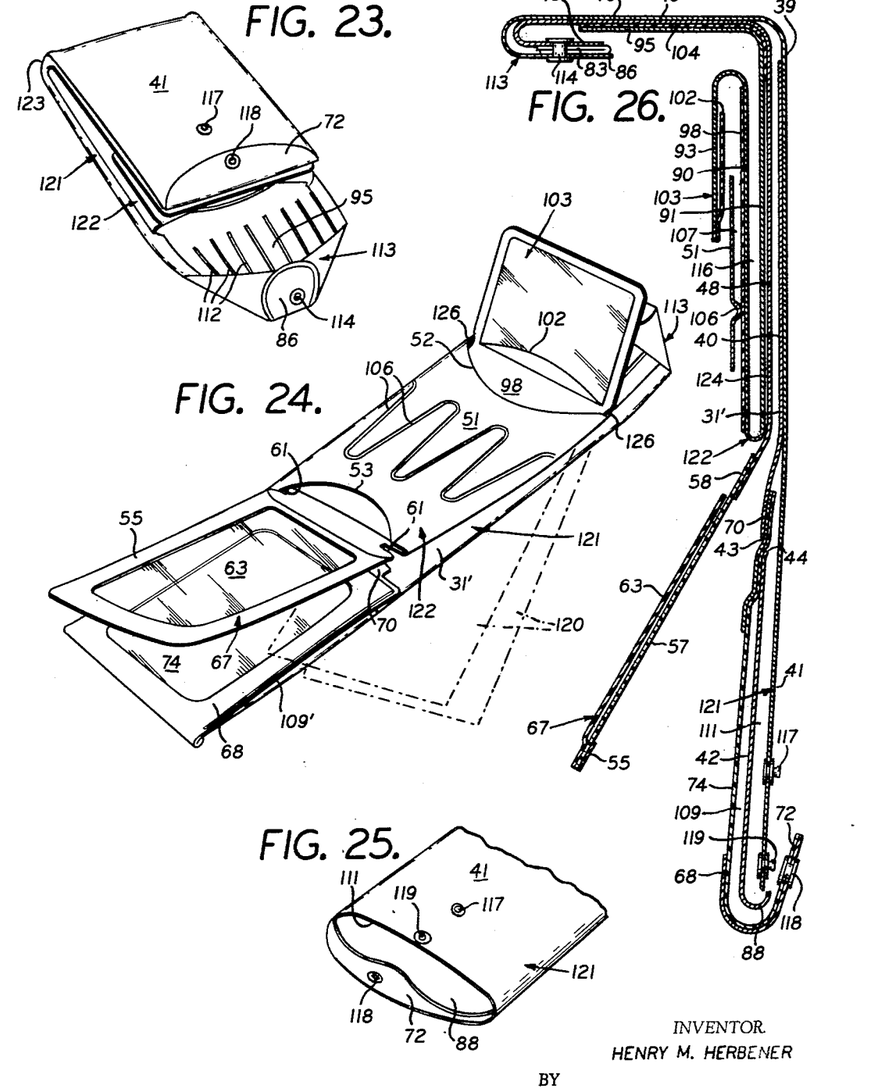
FIG. 23 is a perspective view of the billfolder demonstrating the use of the coin cup.
FIG. 24 is a perspective view of the billfolder in the unfolded condition and demonstrating the placement of bills therein.
FIG. 25 is a fragmentary end perspective view of the reverse side of the billfolder shown in FIG. 24 and showing a pocket thereof and associated elements.
FIG. 26 is an enlarged central vertical longitudinal section through the completed billfolder in an open substantially unfolded condition.

The main blank 30 comprises a generally rectangular main area 31 which, when folded, becomes the longitudinal body portion 31' of the completed billfolder shown in FIGS. 24 and 26. The rectangular area 31 contains imaginary fold lines 32, 32', 33, 34, 35, 36, 37 and 38 dividing the area 31 into substantially rectangular panels 39, 40, 41 and 42. Intermediate the panels 40 and 42 a slot 43 is formed through the blank for an important purpose to be described and has its lower straight edge 44 aligned with the fold line 33 and its opposed arcuate edge 45 disposed within the confines of the panel 40. The ends of slot 43 are spaced equidistantly from fold line 36 and the adjacent free edge 46 of the main blank.

The main blank 30 further comprises a generally L-shaped portion 47 hinged to the rectangular area 31 along the folding line 35 and integral therewith. The L-shaped portion 47 embodies a generally rectangular panel 48 provided at one end with a reduced rectangular extension 49 integral therewith and terminating in tab 49'. An imaginary fold line 50 separates the panel 48 from an adjacent panel 51 having arcuate notches 52 and 53 in its opposite ends. The panel 51 is foldable relative to panel 39 on the fold line 35.

A rectangular pocket extension 54 is carried by the end of panel 48 remote from extension 49 and this pocket extension includes a rectangular frame 55 formed of the material of the main blank and having a large central opening 56 cut therethrough. Overlying the frame 55 on the uncoated side of the main blank is a first panel 57, preferably formed of transparent heat sealable plastic material of the kind used to coat the one face of blank 30. This panel 57 has a top transverse strip extension 58 integral therewith and heat sealed to the lower end portion of the fabric side of panel 48 by a rectangular area of sealing 59. The panel 57 and the underlying frame 55 are foldable transversely with respect to panel 48 on fold line 60. Side notches 61 are formed, for a purpose to be described, in the transparent plastics panel 57 adjacent the top of frame 55. The panel 57 is further heat sealed to the top portion of frame 55 along a line of sealing 62, just below the fold line 60.

A second transparent heat sealable plastic pocket forming panel 63 overlies the panel 57 and is heat sealed thereto around the longitudinal and bottom edge portions 64 and 65 of the pocket, leaving the upper edge 66 of the panel 63 free from attachment to the underlying plastic panel 57. The lines of sealing 64 and 65 also serve to attach the two plastic panels 57 and 63 to the marginal frame 55 at the longitudinal sides and bottom thereof. Thus, a pocket 67 in the completed billfolder, integral with the partition portion 47, is formed by the frame 55 and the two sections or panels 57 and 63 of heat sealable plastic material; and the upper end of this pocket, defined by the edge 66, is open for the reception of cards, identification forms or the like.

The main blank 30 also has a window and pocket forming panel 68 hinged to the panel 41 along the fold line 37 and having a large central generally rectangular opening 69 formed therethrough. The panel 68 is provided at its top with an arcuate tongue 70 formed by the material of the main blank cut to produce the notch 53. The tongue 70 is foldable upon a transverse fold line 71 with respect to the panel 68. The panel 68 is in the nature of an open frame because of the provision of the large opening 69. At its end remote from the tongue 70, the panel 68 has another arcuate tongue 72, for a purpose to be described, foldable upon a line 73 parallel to the line 71.

The entire panel 68, including tongues 70 and 72, is covered on the uncoated face of the main blank 30 by a sheet of transparent heat sealable plastice material 74, identical to the material utilized for the previously-described pocket 67. The plastic sheet 74 is heat sealed to the uncoated face of panel 68 by a line of sealing 75 extending entirely about the margin of the opening 69 and by additional lines of heat sealing 76 and 77 extending about the free edges of the tongues 70 and 72. The plastic sheet 74 thus forms a transparent window in the panel 68, as shown.

A small segment 78 of the material of the main blank remains attached thereto at one side of the tongue 79 and contiguous with the folding lines 35 and 37, to assure a continuous longitudinal folded edge on the completed billfolder.

At the other end of the rectangular area 31 of the main blank 30, a coin cup forming extension 79 is provided which is foldable upon the lines 32, 32'. The extension 79 is provided upon opposite sides with V-notches 80 defining pointed side flaps 81 foldable upon longitudinal fold lines 82 which are extensions of the lines 35 and 36. Additional side flaps 83 are foldable upon dual fold lines 84 and 85, as shown in FIGURE 1, and a central circularly formed flap 86 is foldable relative to the flaps 83 upon a transverse fold line 87.

The lower end of panel 42 has a scalloped tongue 88 hinged thereto on the fold line 34.

An elongated supplemental blank 89 is provided (FIGS. 2 and 4) formed of the same fabric, coated on one side only, used to make the main blank 30. The coated side of the blank is uppermost in FIG. 2 and the uncoated side is uppermost in FIG. 4. The supplemental blank 89 includes a pair of rectangular panels 90 and 91 foldable upon a transverse line 92. A rectangular extension 93 of the blank 89 is foldable upon another transverse line 94. A somewhat reduced extension 95 is carried by the lower end of panel 91 and is tapered at 96.

Figure 4:
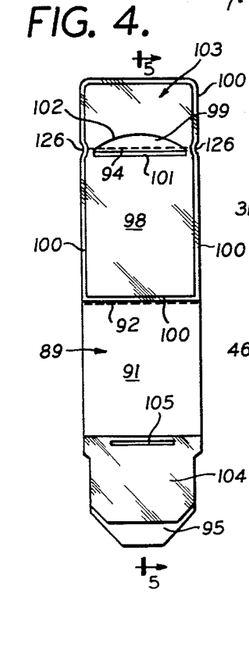
FIG. 4 is a plan view showing the opposite side of the supplemental blank.

The uncoated face of supplemental blank 89 (FIG. 4)

has applied thereto a sheet 98 of transparent heat sealable plastic having a crescent-shaped slot or opening 99 formed therethrough with its lower straight edge adjacent the fold line 94. The sheet 98 is heat sealed to the uncoated face of blank 89 by a marginal line of sealing 100 which extends entirely about the substantially rectangular plastic sheet and about the panel 90 and extension 93, the plastic sheet entirely covering such panel and extension. An additional transverse line of sealing 101 is utilized to attach the straight edge of the slot 99 to the underlying blank. The curved edge 102 of the slot 99 remains unattached to the blank and forms a longitudinally open pocket between the sheet 98 and extension 93 of the blank for postage stamps or the like. This pocket in its entirely is indicated by the numeral 103.

The uncoated face of reduced extension 95 has a transparent all-plastics section or sheet 104 mounted thereon and attached thereto adjacent one edge only by a transverse line of sealing 105. The remainder of the plastics section 104 may be unattached to the underlying extension 95.

Figures 5, 6, 7, 8, 9, 10, 11:
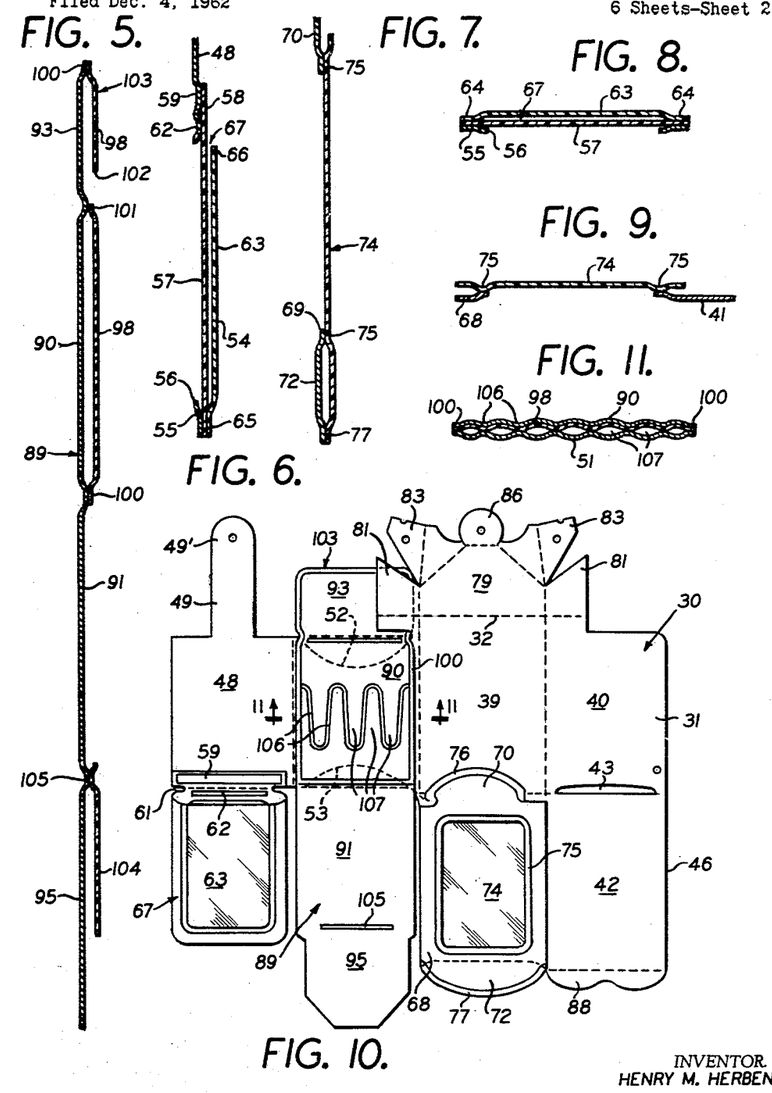
FIG. 5 is an enlarged central vertical longitudinal section taken on line 5—5 of FIG. 4.
FIG. 6 is an enlarged fragmentary vertical section taken on line 6—6 of FIG. 1.
FIG. 7 is a similar section taken on line 7—7 of FIG. 1.
FIG. 8 is an enlarged horizontal cross section taken on line 8—8 of FIG. 1.
FIG. 9 is an enlarged fragmentary horizontal section taken on line 9—9 of FIG. 1.
FIG. 10 is a plan view of the billfolder when the main and supplemental blanks are initially assembled and after a preliminary folding operation.
FIG. 11 is an enlarged fragmentary horizontal section taken on line 11—11 of FIG. 10.

Upon completion of the preliminary operations above described on the main and supplemental blanks 30 and 89 (FIGS. 1 through 4) the actual assembling and folding of the billfolder begins: With reference to FIG. 10, the supplemental blank 89 is placed upon the main blank 30 with the uncoated faces of the two blanks arranged in opposition to each other and with the panel 90 overlying the panel 51 and the thermoplastic sheet 98 is now interposed between the meeting faces fo the two blanks. The extension 93 projects beyond the panel 51 and the panel 91 is disposed between the pocket 67 and the panel 68, FIGURE 10. Heat sealing die means is now brought to bear on opposite sides of the registering panels 51 and 90 of the superposed blanks in FIGURE 10, and a zigzag line of heat sealing 106 is produced through the coated panels 51 and 90 with the plastic sheet 98 therebetween to effectively bond these three layers together in permanent assembly and to permanently connect the main and supplemental blanks 30 and 89. A plurality of tapered, interfitting key pockets 107 with opposed open ends is thus formed between the panel 51 and thermoplastic sheet 98, inwardly of the arcuate notches 52 and 53 of the former. The general arrangement and function of such key pockets is fully disclosed in my prior patents referred to above. The thermoplastic sheet 98 serves the dual purpose of forming one side wall of the key pockets 107 and also providing the bonding agent between the two uncoated faces of the blanks 30 and 89.

Figures 12, 13, 14, 15, 16, 17:
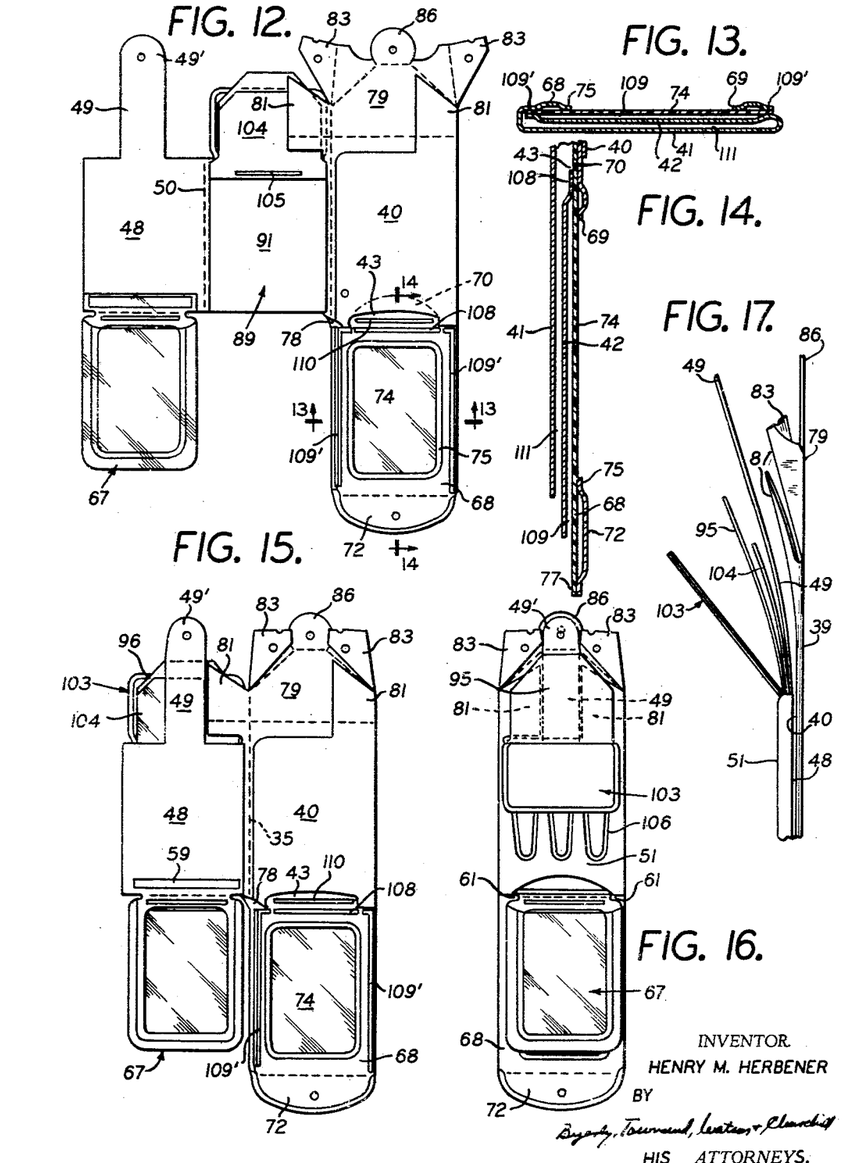
FIG. 12 is a further plan view of the billfolder showing additional folding operations performed upon the structure shown in FIG. 10.
FIG. 13 is an enlarged horizontal section taken on line 13—13 of FIG. 12.
FIG. 14 is an enlarged fragmentary vertical section taken on line 14—14 of FIG. 12.
FIG. 15 is a plan view of the billfolder showing additional folding operations in the making thereof.
FIG. 16 is a plan view showing still further operations.
FIG. 17 is an enlarged fragmentary side elevation partly exploded of the upper portion of the billfolder as depicted in FIG. 16 and prior to completely assembling the coin cup.

In FIGURE 12, the supplemental blank 89 is folded transversely on the line 92 so that the panel 91 overlies the key pockets 107 and the panel 90. The extension 95 and plastic section 104 now overlie the postage stamp pocket 103. At this time, the panel 68 having the transparent window therein is folded on the line 37 so as to overlie the panel 42, after the latter and the attached panel 40 are first folded on the lines 38 and 36 into overlying relation with respect to the panels 41 and 39 shown in FIG. 1. When this folding has been completed (FIG. 12), the arcuate tongue 70 is slipped into the slot 43 and lies between the lower portions of panel 40 and panel 39. At this time, the heat sealing die means is again brought into action to produce lines of sealing 108 and 109' across the top and along the longitudinal edges of the panel 68 to permanently secure this panel and its underlying previously attached plastics sheet 74 to the coated face of panel 42. The opposed uncoated faces of panels 42 and 41 resist heat sealing and remain unattached. The lower end portion of panel 68 is also left unattached to the panel 42 to provide an end opening pocket 109, FIG. 14, between the panels 68 and 42. Simultaneously, another transverse line of heat sealing 110 adjacent the straight edge 44 of slot 43 is produced to permanently secure the tongue 70 to the lower portion of the underlying panel 40, the thermoplastic material on the bottom of the tongue effecting a bond with the coated face of panel 40. The above folding and heat sealing operations also produce another end opening pocket 111, FIG. 14, between the panels 41 and 42, as shown.

In FIG. 15, the panel 48 is folded on the line 50 to overlie the previously folded panel 91 and the dependent transparent pocket 67 is now positioned near one side of the panel 68 and the pockets 109 and 111 below this panel, as above described. The extension 49 now overlies the thermoplastic section 104 in FIG. 15. The flaps 83 are now folded on the lines 84 as shown in FIG. 15.

The structure in FIG. 15 is now further folded on the longitudinal line 35 to cause the panel 48 to lie upon the panel 40 and the pocket 67 to lie upon the panel 68 and associated parts as shown in FIG. 16, and the postage stamp pocket 103 may be folded downwardly as shown in FIG. 16 to expose the upper portion of the billfolder, preparatory to the heat sealing operation on the coin cup.

The relationship of the elements 95, 104, 49, 81, 83, 86 and 49' is shown in FIGS. 16 and 17 prior to the heat sealing and final assembly of the coin cup.

Figure 18:
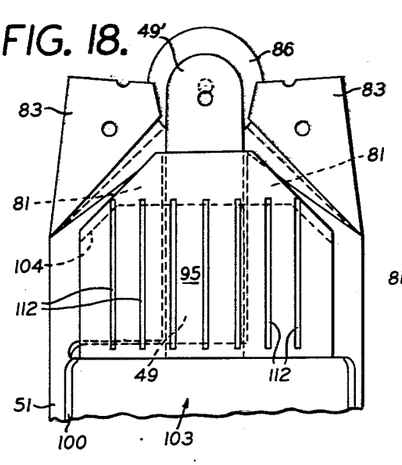
FIG. 18 is an enlarged fragmentary plan view showing the heat sealing operation on the coin cup.

In FIG. 18, parallel longitudinal lines of heat sealing 112 are produced upon the coated face of extension 95 to bond the uncoated face of this extension to the underlying thermoplastic section 104 and through this section to bond the extension 95 to the extension or tab 49 and to the previously folded flaps 81. The precise number of the longitudinal sealing lines 112 may be varied and it is contemplated that four or more of these lines be formed to effect the necessary permanent attachment of the several elements shown in FIG. 17 and in FIG. 18. The uncoated face of underlying extension 79 is uneffected by the above described heat sealing operation.

Figure 19:
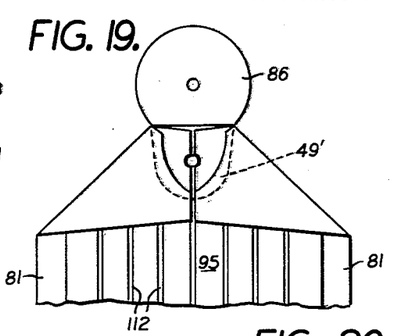
FIG. 19 is a similar view showing additional folding operations upon the coin cup.
Figure 20:
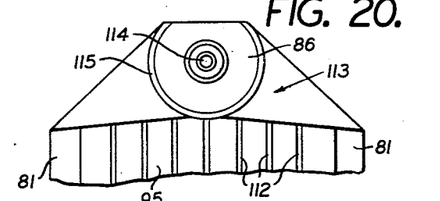
FIG. 20 is a similar view illustrating the completion of the coin cup.

In FIG. 19, after the heat sealing operation is completed, the tab 49' is folded down upon the extension 95 and the extension 79 is further folded upon the lines 85, FIG. 1, to bring the flaps 83 into overlying relationship with the tab 49' and extension 95. The flap 86 is now folded over the other folded element in FIG. 19 to produce a coin cup 113 as shown in FIG. 20. A female snap fastener element 114 is now applied to the folded superposed flaps 86 and 49' and an arcuate heat sealing line 115 is produced through the flap 86 to bond the lower uncoated face thereof to the opposed coated faces of the folded extension 79 which constitute the cup 113, thus permanently securing the elements of the coin cup 113 in assembled relation.

The heat sealing of the billfolder is now completed with the provision of the heat sealing line 115 in FIG. 20, and it is to be noted that the very minimum number of heat sealing operations are necessary to complete the billfolder and the number of operations is substantially reduced as compared to my prior Patents 2,863,484; 2,863,485 and 2,863,486. The arrangement of the longitudinal heat sealing lines 112 on the coin cup render the same easy to cup or bend laterally and these lines do not interfere with the free sliding of coins from the coin pocket 116 (FIG. 26) into the coin cup.

Figure 21:
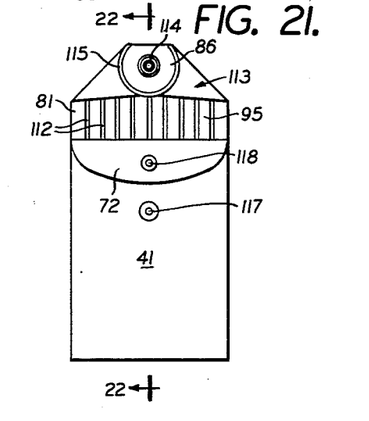
FIG. 21 is a plan view of the completed billfolder transversely folded and with the coin cup unfolded.
Figure 22:
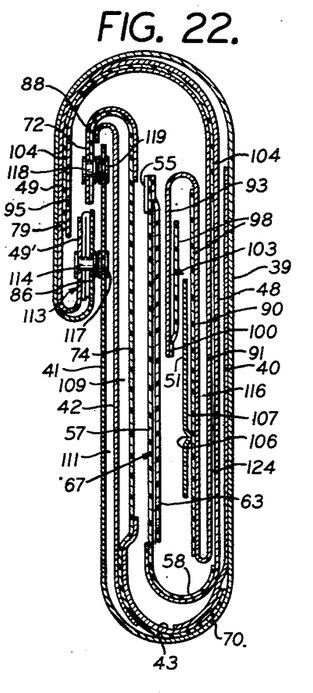
FIG. 22 is an enlarged central vertical section taken on line 22—22 of FIG. 21 and showing the coin cup folded down and attached to the body portion of the billfolder.

A male snap fastener element 117 is applied to the panel 41 (FIG. 21) for coaction with the female snap fastener element 114 to enable complete closing of the billfolder as depicted in FIG. 22. Another female snap fastener element 118 is applied to the tongue 72 for coaction with an underlying male snap fastener element 119 on the panel 41 (see FIG. 22), to effect the closing of end opening pockets 109 and 111.

The heat sealing die means employed to make the billfolder may be the same or similar to the means shown in United States Patent 2,631,646, also identified in my prior patents.

The billfolder is illustrated in the fully open condition in FIG. 24 as when bills 120 are being introduced into the longitudinal compartment between the elongated body portion 121 and the billfolder partition 122. FIG. 23 shows the folded billfolder with the coin cup 113 extended to receive coins from the coin pocket 116.

The tab or extension 49 forms a key element of the present construction in connection with the heat sealing operation described in connection with FIG. 18. The element 49 is the element which anchors the folded partition 122 to the main body portion 121 and prevents unfolding or separating of the structure once it is completely assembled.

The arrangement of the tongue 70 within the slot 43 is another key feature of the invention which eliminates the tendency for the body portion 121 to buckle or wrinkle when the billfolder is folded on the main transverse folding line 123 (FIG. 23). Another very important feature constituting the essence of the invention resides in the use of the various thermoplastic material sections or sheets in combination with the blanks 30 and 89 coated on one side only with thermoplastic material. The all-plastic portions serve at key points to allow joining of opposed uncoated faces of the fabric blanks, as well as the additional purposes of forming pocket sides and transparent windows and pockets in the billfolder. The use of the all-plastic portions or sections further serves to produce tear-resistant "sparkled" edges on all sections of the billfolder where the plastic material is heat sealed to an uncoated face at the edge of the latter. Additionally, the billfolder has no raw or cut edges and all of the edges are formed as folded edges which are smooth and attractive.

In general, the heat-sealed plastic billfolder constructed according to this invention possesses the desired qualities of the more expensive leather billfolders while at the same time being substantially as inexpensive as the all-plastic billfolders covered by my prior patents.

Figure 27:
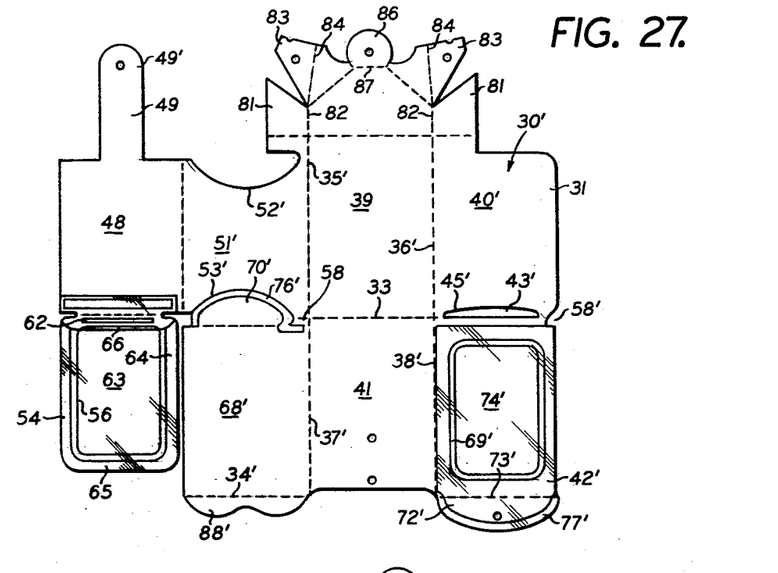
FIG. 27 is a plan view of a modified form of a main blank of coated fabric with the uncoated side uppermost.
Figure 28:
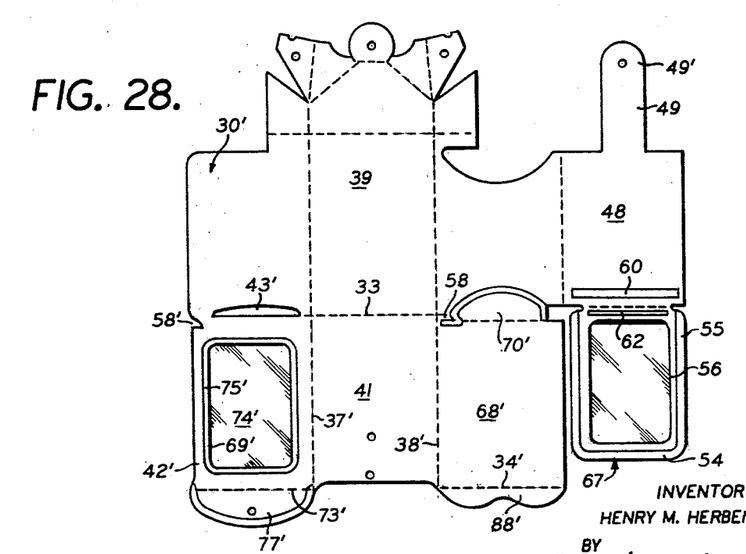
FIG. 28 is a plan view of the coated side of the form of main blank illustrated in FIG. 27.

The modification of my invention that is illustrated in FIGS. 27 and 28 utilizes a blank 30' which is essentially the same as the blank 30 illustrated in FIGS. 1 and 3 except that the sheet 74' of plastic material is attached to panel 42'; the arcuate tongue 72' extends from the panels 42'; and the scalloped tongue 88' extends from the panel 68' which is provided with tongue 70' and is connected with panel 40' by a strip which coacts with notch 58' at the upper outside edge of panel 42' in the assembly of the blank illustrated in FIGS. 27 and 28 into a finished billfolder. The supplemental blank illustrated in FIGS. 2 and 4 is connected to the blank 30' as described above in connection with the formation of a billfolder from the blank 30. The blank 30' is folded along imaginary fold lines 35'–37', 36'–38' in such manner that the panel 40' overlies panel 39, the panel 68' overlies panel 41, the panel 42' overlies the panel 68' and, at the same time, by virtue of the coaction of notch 58' with strip 58, panel 51' overlies panel 40' with a continuous folded edge from one end of the billfolder to the other. Assembly of the billfolder from the blank 30' is otherwise substantially the same as the assembly of a billfolder from the blank 30 which has been described.

In the billfolder of the present invention, all of the several pockets are longitudinal or end opening pockets with respect to the longitudinal dimension of the billfolder, including a secret pocket 124 (FIG. 26) formed between the panel 48 and the panel 91. Additional features reside in the interlocking notches 61 at the top of the dependent pocket 67 to resist tearing and to allow continuous and uninterrupted folded edges on the body portion 121. Similar notches 126 on the supplemental blank 89 serve a similar purpose in the invention.

It is to be understood that the form of the invention herewith shown and described is to be taken as a preferred example of the same, and that various changes in the shape, size and arrangement of parts may be resorted to, without departing from the spirit of the invention or scope of the subjoined claims. For instance, the portion of the sheet 98 of transparent heat sealable plastic that is applied to the uncoated face of supplemental blank 89 (FIG. 4) to overlie panel 51 for the formation of key pockets 107 can be applied to the panel 51 directly and heat sealed along edges 52 and 53 to provide sparkled edges there. Also, the sheet of transparent plastic 74' can be extended beyond the slot 43' (FIG. 27) with an opening corresponding to slot 43' formed therein and it can then be heat sealed around the edges of slot 43' to provide sparkled edges there also.

What I claim is:

1. A method of producing a billfolder from an initially flat blank formed of fabric and coated on one side only with a thermoplastic comprising folding said blank to form said billfolder including plural pocket means therein, placing sections of thermoplastic sheet material between opposed uncoated portions of the folded blank, and heat sealing through the blank and said thermoplastic sheet material to cause permanent joining of said uncoated portions in the completed billfolder and to form said pockets so that the pockets embody portions of the blank and portions of said thermoplastic sheet material.

2. In a billfolder having a body portion formed of two layers of flexible sheet material and being foldable transversely and tending to wrinkle when folded, the improvement comprising a panel overlying the inner side wall of said body portion and including a tongue, said inner side wall having a slot formed therethrough near the folding line of the body portion and receiving said tongue so that the tongue lies between said inner and outer side walls of the body portion, and means to secure said tongue to the inner side wall near the folding line of the body portion.

3. A billfold as defined by claim 2, wherein said means is a line of sealing permanently attaching said tongue to said inner side wall.

4. A billfolder including a folded body portion and an attached partition portion hinged to the body portion at one longitudinal edge of the latter, said body portion and partition portion formed from initially flat fabric blank means coated on one side only with thermoplastic material, and sections of all-thermoplastic sheet material on said body and partition portions to form thereon window and pocket means and heat sealed to said partition and body portions and serving additionally to permanently connect said partition and body portions in assembled superposed relationship and serving additionally to heat seal together opposed uncoated faces of the blank means constituting said partition and body portions.

5. In a blank which is initially flat and foldable to produce a billfolder, said blank formed of fabric and coated on one side only with thermoplastic, said blank having a slot formed therein and having an opening spaced from the slot, a section of transparent thermoplastic sheet material overlying said opening and heat sealed to the portion of the blank surrounding said opening to form a transparent window in the blank and having an extension forming a tongue to pass through said slot when the blank is folded, whereby said tongue may be heat sealed to an underlying uncoated portion of the folded blank.

6. A billfolder blank as defined by claim 5, wherein said tongue includes a backing layer formed of the material of said blank and heat sealed to said extension of said thermoplastic sheet material.

7. A billfolder blank as defined by claim 5, having a pocket extension including a pocket side formed of thermoplastic sheet material having an extension overlying an uncoated edge portion of the blank and heat sealed thereto.

8. A billfolder blank as defined by claim 5, and a supplemental blank utilized with said billfolder blank including an uncoated side having a lining of thermoplastic sheet material heat sealed thereto and engageable with an uncoated portion of said billfolder blank and heat sealed thereto along a zigzag line to form interfitting key pockets having side walls formed by said billfolder blank and opposite side walls formed by said supplemental blank having said lining.

9. A billfolder formed of sheet fabric coated on one side only with thermoplastic and including a folded multi-layer body portion and a folded multi-layer partition hinged to said body portion along one longitudinal edge thereof, coin cup extension means on said body and partition portions including an intermediate layer of thermoplastic sheet material enabling heat sealing of uncoated faces of said extension means to produce said coin cup and to effect permanent attachment of said partition portion to said body portion, and additional thermoplastic sheet material between uncoated layers of the partition portion to facilitate heat sealing said layers together to form key pockets in the partition portion.

10. A billfolder as defined by claim 9, and additional thermoplastic sheet material on said body portion and heat sealed thereto to form window and pocket means thereon and including a tongue extension heat sealable to an uncoated face of the body portion near the longitudinal center and main transverse folding line thereof.

11. In a billfolder or the like, a main blank formed of fabric and having one side thereof coated with heat sealable plastic material and having an uncoated side, said main blank including a portion foldable to produce a billfolder body portion and another portion foldable to produce a billfolder partition, a secondary blank formed of fabric and coated on one side with heat sealable plastic material and having an uncoated side, said secondary blank foldable upon itself to produce a pocket in said billfolder, a section of heat sealable plastic material sealed to the uncoated side of the secondary blank and disposed between such uncoated side and a portion of the uncoated side of the main blank when said blanks are superposed with their uncoated sides in opposition and heat sealed together with said section of plastic material therebetween along a zigzag line of sealing to produce a plurality of oppositely opening key pockets between the main blank and said section of plastics material, and means including additional lines of heat sealing to secure said blanks permanently in folded relation in the completed billfolder.

12. A billfolder as defined by claim 11, and a coin cup extension on the main blank and a coacting coin cup extension on the secondary blank having a section of heat sealable plastics material sealed thereto, whereby said extensions may be heat sealed together permanently to produce a coin cup on the folded completed billfolder.

13. In a method of making a billfolder or the like, the steps of arranging a fabric blank coated on one side thereof with heat sealable plastics in a substantially unfolded preliminary position, securing all-plastic sheet material to selected areas of the uncoated side of said blank preliminary to folding and heat sealing of the blank, folding the blank in a manner to arrange said all-plastic sheet material between opposed uncoated faces of the blank, and then heat sealing through multiple layers of the folded blank and said all-plastic material to permanently bond the blank in the folded condition and to provide therein pockets formed between adjacent uncoated faces of the blank and said all-plastic sheet material.

14. A billfolder comprising a body portion formed of fabric coated on one side only with heat sealable plastic and including superposed walls having uncoated sides arranged innermost and plastic coated sides arranged outermost and having folded edges, said body portion having at least one longitudinal pocket provided with a transparent window formed of a section of all-plastic heat sealable material sealed to one uncoated fact of said blank, a partition for said billfolder body portion hinged thereto along one longitudinal edge thereof and formed of a section of fabric coated on one side only with heat sealable plastic and folded in the completed billfolder so as to be generally coextensive with said body portion and superposed therewith, transparent pocket means on said partition formed of heat sealable plastic and being heat sealed to an uncoated face of said partition, all-plastic lining means between adjacent uncoated faces of said partition and heat sealed thereto to form therewith additional pocket means in said partition and to permanently secure said partition in folded relation ship, said partition having a coin pocket open near one end of the body portion and partition and having coated plastic inner faces, and a coin cup carried by said one end of the body portion and partition and having coated plastic inner and outer faces and adapted when cupped to receive coins slidably from the coin pocket, said coin cup having in all-plastic inner liner between opposed uncoated faces thereof, said inner liner heat sealed with said last-named faces to permanently secure the coin cup in assembled relation.

15. A billfolder as defined by claim 14, and wherein said last-named heat sealing of the coin cup is in the form of a plurality of parallel spaced lines of heat sealing longitudinally of the coin cup and coin pocket.

16. A billfolder having an elongated body portion including inner and outer opposed side walls and adapted to be folded at a main transverse folding line and normally tending to wrinkle near said folding line, a panel section carried by said body portion near said folding line, a tongue carried by said panel section and heat-sealed to said inner side wall near said folding line, and attaching said panel section to said inner side wall of the body portion locally near said folding line to thereby resist said wrinkling of the body portion.

References Cited in the file of this patent

UNITED STATES PATENTS

| | | |
|---|---|---|
| 2,496,796 | Kardon | Feb. 7, 1950 |
| 2,629,419 | Klein | Feb. 24, 1953 |
| 2,732,874 | Carstensen | Jan. 31, 1956 |